(12) United States Patent
Maguire

(10) Patent No.: US 9,969,137 B2
(45) Date of Patent: May 15, 2018

(54) MULTI PLY THERMOPLASTIC CONVEYOR BELT

(71) Applicant: ContiTech Transportbandsysteme GmbH, Hannover (DE)

(72) Inventor: David Joseph Maguire, Hudson, OH (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days. days.

(21) Appl. No.: 15/141,892

(22) Filed: Apr. 29, 2016

(65) Prior Publication Data
US 2017/0313004 A1 Nov. 2, 2017

(51) Int. Cl.
*B29D 29/06* (2006.01)
*B29K 27/06* (2006.01)
(Continued)

(52) U.S. Cl.
CPC .......... *B29D 29/06* (2013.01); *B29C 66/1284* (2013.01); *B29K 2027/06* (2013.01);
(Continued)

(58) Field of Classification Search
CPC .............. B29D 29/06; B29C 66/11284; B29C 66/1284; B29C 66/128; B29C 66/12841;
(Continued)

(56) References Cited

U.S. PATENT DOCUMENTS

| 4,034,617 A | 7/1977 | Guyer |
| 4,216,856 A | 8/1980 | Moring et al. |

(Continued)

FOREIGN PATENT DOCUMENTS

| DE | 3933710 A1 | 4/1990 |
| DE | 102010029355 A1 | 12/2011 |

(Continued)

OTHER PUBLICATIONS

International Search Report and Written Opinion dated Jul. 7, 2017 of corresponding international application PCT/EP2017/059636.

*Primary Examiner* — John Goff
(74) *Attorney, Agent, or Firm* — David L. Cate

(57) ABSTRACT

Methods include providing a plurality fabric material layers, applying a plastisol layer between each fabric material layer forming plurality fabric material layers thereby creating a belt carcass, pressing the fabric material layers together with the plastisol layer(s) at a pressure of at least 5 psi to produce a preformed fabric carcass while heating the preformed fabric carcass while heating the preformed fabric carcass to a temperature which is within the range of about 360° F. to about 450° F. for a period of at least 6 minutes, disposing a thermoplastic elastomer polyvinyl chloride alloy composition onto the upper and lower surfaces of the fabric carcass, pressing the thermoplastic elastomer polyvinyl chloride alloy composition onto the upper and lower surfaces of the fabric carcass, and splicing opposing distal ends of the belt in a stepped splice configuration. The layers may be devoid of covering strips of lattice fabric disposed adjacent an abutment of any proximally positioned fabric layer.

20 Claims, 7 Drawing Sheets

(51) Int. Cl.
  *B29K 277/00* (2006.01)
  *B29K 105/00* (2006.01)
  *B29C 65/00* (2006.01)

(52) U.S. Cl.
  CPC .. *B29K 2105/0008* (2013.01); *B29K 2277/00* (2013.01); *B29K 2313/02* (2013.01); *B29K 2905/12* (2013.01)

(58) Field of Classification Search
  CPC . B29C 66/12842; B29C 66/02; B29C 66/124; B29C 66/126; B29C 66/855; B65G 15/34
  USPC .................. 156/304.1, 304.5; 198/804, 847
  See application file for complete search history.

(56) References Cited

U.S. PATENT DOCUMENTS

| | | | |
|---|---|---|---|
| 4,279,676 A * | 7/1981 | Morrison | ............... F16G 3/10 156/159 |
| 4,526,637 A | 7/1985 | Long | |
| 4,813,533 A | 3/1989 | Long | |
| 4,928,812 A | 5/1990 | van Calker et al. | |
| 5,326,411 A | 7/1994 | Arnold | |
| 5,974,935 A * | 11/1999 | Willis | ............... B26D 3/28 30/293 |
| 6,132,541 A * | 10/2000 | Heaton | ............... B29C 65/02 156/159 |
| 6,328,840 B1 | 12/2001 | Takano et al. | |
| 6,827,803 B1 | 12/2004 | Willis | |
| 7,776,768 B2 | 8/2010 | Hansel et al. | |
| 7,815,043 B2 | 10/2010 | Hawkins et al. | |
| 7,909,719 B2 | 3/2011 | Leighton et al. | |
| 8,007,917 B2 | 8/2011 | Alexander et al. | |
| 8,192,317 B2 | 6/2012 | Lee et al. | |
| 8,240,463 B2 | 8/2012 | Graber et al. | |
| 8,505,714 B2 | 8/2013 | Leighton et al. | |
| 8,910,780 B2 | 12/2014 | Pero et al. | |
| 2006/0270298 A1 | 11/2006 | Kuhn et al. | |
| 2009/0233746 A1 | 9/2009 | Leighton | |
| 2012/0015572 A1 | 1/2012 | Behrens | |
| 2014/0018501 A1 * | 1/2014 | Yoshida | ............. C08L 23/0869 525/130 |
| 2014/0021021 A1 | 1/2014 | Pero et al. | |
| 2015/0298407 A1 | 10/2015 | Matsudaira | |

FOREIGN PATENT DOCUMENTS

| | | |
|---|---|---|
| DE | 102013201579 A1 | 7/2014 |
| EP | 0484735 A1 | 5/1992 |
| EP | 0522313 A1 | 1/1993 |
| JP | S6198529 A | 5/1986 |
| JP | 63315410 A * | 12/1988 |
| WO | 2006076888 A2 | 7/2006 |

* cited by examiner

MULTI PLY THERMOPLASTIC CONVEYOR BELT

FIELD

The field to which the disclosure generally relates is conveyor belts manufactured with a thermoplastic polymer and which include a multiply fabric carcass as well as novel methods of manufacturing such belts.

BACKGROUND

This section provides background information to facilitate a better understanding of the various aspects of the disclosure. It should be understood that the statements in this section of this document are to be read in this light, and not as admissions of prior art.

Conventional conveyor belts which are used in heavy duty applications are typically comprised of a cured rubber or polyvinyl chloride (PVC) based material as a top layer, a cured rubber or PVC based material as a bottom layer, and a single ply fabric reinforcement layer (a carcass) having a warp and weft, disposed between the top layer and the bottom layer. The cured rubber or polyvinyl chloride based material may also serve to adhere various components of the fabric reinforcing carcass. For example, individual layers and reinforcing elements included in the carcass may be encapsulated in a matrix of polymeric elastomeric resin, such as a polyvinylchloride based material. The individual layers are saturated with the liquid elastomer-forming polymeric resin prior to being joined together, and the reinforcing elements may be inserted, for example, by tufting, sewing, or stitch-bonding. In cases where the liquid saturate is a polyvinylchloride plastisol, the resin is gelled, or otherwise cured, by application of heat.

Conveyor belts of these types can offer excellent performance characteristics and a relatively long service life. However, this construction is limited by the type of splicing techniques that can be used, and generally requires mechanical splicing or finger type splicing to produce the belt as a finish product, which can be achieved only in complex operations. Furthermore, in some instances, thermoplastic belts having top and/or bottom layers based upon general purpose PVC may present issues related to hardness, coefficient of friction with materials conveyed or other conveying equipment, as well as insufficient abrasion resistance.

Thus, there is an ongoing need for manufacturing conveyor belts utilizing improved splicing techniques, as well as top and bottom layers formed from materials with improved properties, such needs met, at least in part, with embodiments according to the following disclosure.

SUMMARY

This section provides a general summary of the disclosure, and is not a necessarily a comprehensive disclosure of its full scope or all of its features.

In a first aspect of the disclosure, a method of manufacturing an endless belt is provided which includes impregnating a fabric material with a bonding agent in a plastisol to form a coated fabric material, applying a plastisol layer between two or more layers of the coated fabric material thereby creating a belt carcass, and continuously feeding the belt carcass into a double belt press which presses the impregnated fabric materials together with the plastisol layer(s) at a pressure of at least 5 psi (or even a pressure within the range of about 14 psi to about 30 psi) to produce a preformed fabric carcass while heating the preformed fabric carcass. Then the fabric carcass is continuously withdrawn from the double belt press, a thermoplastic elastomer polyvinyl chloride alloy composition is disposed onto the upper and lower surfaces of the fabric carcass, and the thermoplastic elastomer polyvinyl chloride alloy composition is pressed onto the upper and lower surfaces of the fabric carcass by continuously feeding the fabric carcass into a second double belt press which is maintained at a temperature of at least 340° F., and at a pressure of at least 5 psi. The finished belt is continuously withdrawn from the second double belt press, and opposing distal ends of the belt are spliced, or otherwise connected, in a stepped splice configuration. In some aspects, the impregnated fabric materials and the plastisol layer(s) are pressed at a pressure of at least 5 psi to produce a preformed fabric carcass while heating the preformed fabric carcass to a temperature which is within the range of about 360° F. to about 450° F. for a period of at least 6 minutes. For some embodiments, the layers formed from the thermoplastic elastomer polyvinyl chloride alloy composition are devoid of covering strips of lattice fabric disposed adjacent an abutment of any proximally positioned fabric layer.

In some embodiments, the fabric material is a polyester fabric or a nylon fabric. The bonding agent may include about 20 weight percent to about 60 weight percent toluene diisocyanate and about 40 weight percent to about 80 weight percent of a plasticizer, and the weight ratio of the bonding agent to the plastisol may be within the range of 2:98 to about 10:90. In some cases, the inside surfaces of fabric material are sequentially coated with a mixture of a plastisol and a bonding agent, and then a plastisol to form coated fabric material. The thermoplastic elastomer polyvinyl chloride alloy composition may further include at least one filler, and in some aspects, includes chlorinated polyethylene and optional antistatic agent.

In another aspect of the disclosure, methods include providing a plurality fabric material layers, applying a plastisol layer between each fabric material layer forming plurality fabric material layers thereby creating a belt carcass, continuously feeding the belt carcass into a double belt press which presses the fabric material layers together with the plastisol layer(s) at a pressure of at least 5 psi to produce a preformed fabric carcass while heating the preformed fabric carcass, continuously withdrawing the fabric carcass from the double belt press, disposing a thermoplastic elastomer polyvinyl chloride alloy composition onto the upper and lower surfaces of the fabric carcass, pressing the thermoplastic elastomer polyvinyl chloride alloy composition onto the upper and lower surfaces of the fabric carcass by continuously feeding the fabric carcass into a second double belt press, continuously withdrawing the finished belt from the second double belt press, and (8) splicing opposing distal ends of the belt in a stepped splice configuration. The fabric material layers and the plastisol layer(s) may in some aspects be pressed at a pressure of at least 5 psi to produce a preformed fabric carcass while heating the preformed fabric carcass to a temperature which is within the range of about 360° F. to about 450° F. for a period of at least 6 minutes. The preformed fabric carcass may even be maintained in the double belt press at a temperature which is within the range of about 380° F. to about 425° F. for a period of at least 8 minutes. The layers formed from the thermoplastic elastomer polyvinyl chloride alloy composition may also be devoid of covering strips of lattice fabric disposed adjacent an abutment of any proximally positioned fabric layer.

Yet other embodiments of the disclosure are methods which include providing a plurality fabric material layers, applying a plastisol layer between each fabric material layer forming plurality fabric material layers thereby creating a belt carcass, pressing the fabric material layers together with the plastisol layer(s) at a pressure of at least 5 psi to produce a preformed fabric carcass while heating the preformed fabric carcass while heating the preformed fabric carcass to a temperature which is within the range of about 360° F. to about 450° F. for a period of at least 6 minutes, disposing a thermoplastic elastomer polyvinyl chloride alloy composition onto the upper and lower surfaces of the fabric carcass, pressing the thermoplastic elastomer polyvinyl chloride alloy composition onto the upper and lower surfaces of the fabric carcass, and splicing opposing distal ends of the belt in a stepped splice configuration, wherein the layers formed from the thermoplastic elastomer polyvinyl chloride alloy composition are devoid of covering strips of lattice fabric disposed adjacent an abutment of any proximally positioned fabric layer.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
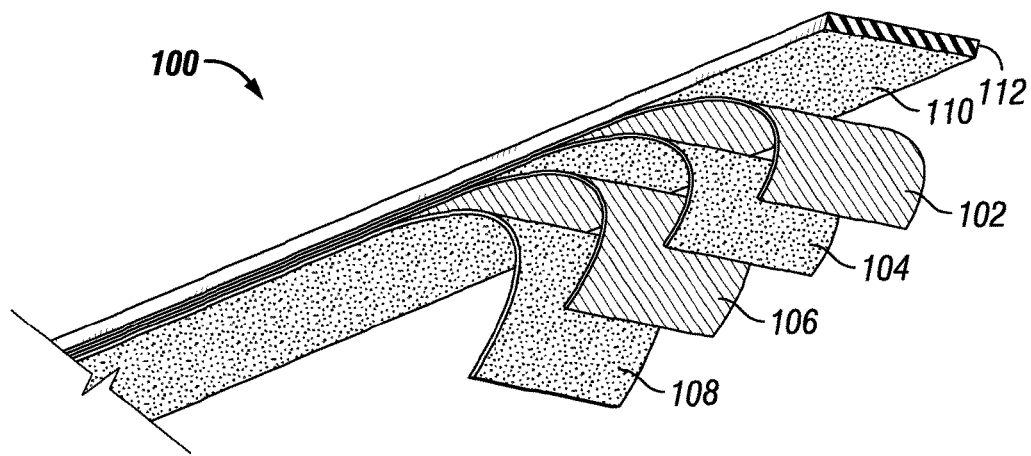
FIG. 1 illustrates in a perspective view, an end of a conveyor belt where the layers are peeled back, according to an embodiment of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range or dimension listed or described as being useful, suitable, or the like, is intended that any and every concentration or amount or dimension within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Conveyor belts prepared according to methods of the disclosure typically include an elastomeric body having a load carrying surface and a parallel pulley engaging layer, and a fabric reinforcement containing carcass disposed within the elastomeric body of the belt. The fabric reinforcement carcass typically includes a plurality of fabric layers, with intermediate layers disposed thereon. In some embodiments, the conveyor belts are formed as a continuous belt, and the ends cut and shaped in such way to enable step splicing among the plurality of layers, as described in further detail below. In some aspects, such a stepped splice insures that all layers in the splice seam do not approach a drive pulley simultaneously. These features, although not required, can improve the splice joint in some applications.

Any of a variety of natural or synthetic elastomeric materials suitable for conveyor belt applications may be used to form the load carrying layer, bottom layer, pulley engaging layer, and intermediate layer(s), including, but not limited to those material described in as used in belts disclosed in U.S. Pat. No. 8,910,780 B2, which is incorporated herein by reference thereto. A non-limiting list of exemplary materials includes chloro-sulfonyl-polyethylene, natural rubber, chloroprene, nitrile-butadiene rubber, butadiene rubber, isoprene, styrene-butadiene, modified polysiloxanes, polyester urethane, polyether urethane, polyvinyl chloride, fluorocarbon polymers, polyolefin, such as polyethylene or polypropylene, and the like. When used in forming the intermediate layers, the elastomeric material may be in the form of a plastisol, such as a liquid substance that can be converted into a solid plastic simply by heating, and which consists of particles of synthetic resin dispersed in a nonvolatile liquid. In some embodiments, the elastomeric material comprises natural rubber. In some other embodiments, the synthetic elastomeric materials are those based upon thermoplastic elastomer polyvinyl chloride alloys (TPE/PVC alloy). When used, the properties of the thermoplastic elastomer polyvinyl chloride alloy cover material will be similar or like rubber properties, and have a hardness value in a range between about 60 to about 70 Shore A, DIN abrasion values below 200 mm$^3$ and a high coefficient of friction. In addition, this material may include both elastomers and, more permanent plasticizers to ensure optimal flexibility retention.

As PVC has a high polarity and high compatibility with a variety of other high-performance plastics, they may be mixed to form polymer alloys. Using polymer alloying techniques, shortcomings of pure rigid PVC components may be overcome. Generally, in order to improve properties of PVC materials useful in some aspects of the disclosure, additives having rubber-like properties such as acrylonitrile-butadiene-styrene (ABS), methyl methacrylate-butadiene-styrene MBS, acrylic rubber, chlorinated polyethylene, polymers of ethylene-vinyl acetate (EVA), and the like, are mixed with PVC. Sufficient properties for use in accordance with some embodiments of the disclosure may be obtained by blending about 5 to about 25 parts by weight of these additives to 100 parts by weight of PVC in a compounding process. In some aspects, additives in the form of micro particles are dispersed within a microscopic structure of PVC. When the PVC layers receive an impact or other typical force, these micro particles in the molecular structure absorb the impact energy and prevent damage to the PVC layers.

The elastomeric materials used in forming conveyor belts in accordance with the disclosure may also include additives for enhancing flame retardancy, wear and chunk resistance, rolling resistance, aging resistance (e.g., ozone and UV resistance), and the like. Vulcanization aids, cross-linking agents, oils, accelerators, or other formation aids may also be used.

Similarly, the central reinforcing layer may be formed from any of a variety of materials, either woven or nonwoven, in any desirable weight and orientation, and is comprised of multiple individual plies separated by appropriate elastomeric or adhesive layers. Such materials may include a wide variety of synthetic and manmade fibers, including polyester, nylon, aramid (e.g., Kevlar), glass, polypropylene, cellulose, wool, or others. The fibers may be multi-filament, monofilament, or staple fibers. In one embodiment, the central reinforcing layer includes multiple plies of polyester and/or nylon.

In some aspects, the multiple plies are formed from fabrics continuously impregnated with a bonding agent in plastisol to form coated fabric material. In some cases, the fabric utilized may be comprised of cotton, a polyester, a nylon, or a blend thereof. For example, the polyester can be polyethylene terephthalate or polyethylene naphthalate. In some cases the polyester can be a copolyester that contains repeat units, which are derived from both terephthalic acid and isophthalic acid or dimethyl esters thereof. In such cases, the copolyester will typically contain at least about 95 weight percent terephthalic acid and up to about 5 weight percent isophthalic acid. More typically, the copolyester will contain at least about 97 weight percent terephthalic acid and up to about 3 weight percent isophthalic acid. The polyester fabric can optionally be made from polyester staple yarn to improve adhesion characteristics. The nylon fabrics that can be used in conjunction with this disclosure may be comprised of virtually any type of nylon, such as nylon-6,6, nylon-6,12, nylon-6,10, nylon-6,9, nylon-6, nylon-11, or nylon-12. For commercial reasons, the nylon will typically be nylon-6,6 or nylon-6. In any case, where used, the fabric material will typically be a woven fabric, although non-woven fabrics may be useful as well.

Surfaces of the impregnated fabrics are the surfaces that will come into contact with intermediate layers (without bonding agent), and such intermediate layers may also be in contact with other layers of the fabrics which make up the fabric carcass, ultimately utilized as the carcass of a conveyor belt. In some aspects, this impregnation step is carried out in a continuous process, by passing the fabric through an impregnation zone, such as a dipping bath or a coating wheel under low tension, preferably less than 6 pounds per inch of width, more preferably in the range of 1 to 5 pounds per inch of width (0.179 to 0.893 kg per cm of width). The weight ratio of the bonding agent to the plastisol may be within the range of 2:98 to 10:90, or even within the range of 4:96 to 8:92. In some cases, the weight ratio of the bonding agent to the plastisol may be within the range of 5:95 to 7:93. However, any suitable value for weight ratio of bonding agent to plastisol is within scope of this disclosure.

The plastisol used in some embodiments according to the disclosure are dispersions based upon PVC, while in some other embodiments, thermoplastic elastomer polyvinyl chloride alloys. The bonding agent employed typically contains diisocyanate groups which can improve the adhesion characteristics between the fabric and the PVC. As is disclosed in U.S. Pat. No. 7,776,768 B2 (incorporated herein by reference thereto) preference is given to use, as adhesion promoters, of isocyanurates which contain isocyanate groups and which can be prepared by oligomerization, in particular trimerization, from diisocyanates. The diisocyanates most suitable for this purpose are the mixtures, which are readily available commercially, of the isomeric diisocyanatotoluenes (TDI), composed mainly of 2,4-diisocyanatotoluene (2,4-TDI) and 2,6-diisocyanatotoluene (2,6-TDI). These can easily be reacted almost completely to give isocyanurates which contain isocyanate groups. Almost complete reaction is necessary because operator safety and product safety require that the residual content of diisocyanates in the adhesion promoter preparation remains below 1.0% by weight. Diisocyanatodiphenylmethanes (MDI) are likewise readily available but are less suitable, and are more difficult than TDI to trimerize and can therefore lead to undesirably high residual content of diisocyanates. Isocyanurates which contain isocyanate groups based on MDI moreover exhibit poor solubility and have a tendency towards crystallization.

Isocyanurates which contain isocyanate groups are particularly easy to handle as adhesion promoters when they are used in the form of a solution in a plasticizer. In a practical method, the isocyanurates which contain isocyanate groups and are derived from TDI are likewise prepared in the plasticizer used as solvent. DE 24 19 016 A1 (GB 145 570 A1) describes by way of example these adhesion promoters and adhesion promoter preparations comprising plasticizer, and their preparation and their use.

In a next step, at least one layer of plastisol without bonding agent is applied between two of the impregnated fabric layers. This process is repeated depending on the number of impregnated fabric layers. The plastisol may be the same or different than the plastisol used to impregnate the fabric. Once the plastisol layer is applied, it may be pregelled by heating to a temperature between about 100° F. (37.8° C.) and about 200° F. (93.3° C.), more preferably between about 150° F. (65.5° C.) and about 180° F. (82.2° C.). This process is completed with minimum tension on the fabric layers, preferably less than about 6 pounds per inch of width (1.071 kg per cm of width), and more preferably at a tension of about 1 to about 5 pounds per inch of width (0.179 to 0.893 kg per cm of width). The result of this step is a pregelled fabric carcass.

The pregelled fabric carcass may then be continuously fed into a double belt press where it is pressed together at a pressure of at least about 5 psi ($3.5 \times 10^4$ pascals). The belts of the belt press will typically have surfaces which are comprised of polytetrafluoroethylene (PTFE) impregnated fiber glass or a thin layer of stainless steel. The belt press will typically apply a pressure of about 5 psi to about 35 psi ($3.5 \times 10^4$ pascals to $2.4 \times 10^5$ pascals), more typically about 10 psi to about 30 psi, will preferably apply a pressure of about 12 psi to about 25 psi ($8.3 \times 10^4$ pascals to $1.7 \times 10^5$ pascals), and will most preferably be about 15 psi to about 20 psi ($1.0 \times 10^5$ pascals to $1.4 \times 10^5$ pascals).

The fabric carcass may be maintained in the double belt press at a temperature which is within the range of about 360° F. (182° C.) to about 450° F. (232° C.) for a period of at least about 6 minutes. The temperature will preferably be maintained within the range of about 375° F. (191° C.) to about 425° F. (218° C.) and will most preferable be maintained within the range of about 390° F. (199° C.) to about 410° F. (210° C.). The fabric carcass may typically have a residence time in the double belt press which is within the range of about 8 minutes to about 14 minutes and will most preferably have a residence time in the double belt press which is within the range of about 9 minutes to about 12 minutes.

After being maintained in the double belt press for the desired residence time, the fabric carcass may be continuously removed from the press as a finished fabric carcass which is suitable for use as the carcass of a conveyor belt. In one embodiment such a conveyor belt is made continuously with the finished fabric carcass as it is being withdrawn from the double belt press. In such a process, elastomeric material is continuously disposed onto the upper and lower surfaces of the fabric carcass to form the load carrying layer and the pulley engaging cover layer. The elastomeric material is provided in the form of particles which typically have a size distribution of between about 0.25 mm and about 1 mm, with an average of about 0.5 mm. The elastomeric material is then pressed onto the upper and lower surfaces of the fabric reinforcement by continuously feeding the fabric reinforcement into a second double belt press which is maintained at a temperature of at least about 340° F. (171° C.). The elastomeric material can optionally include fillers, such as calcium carbonate, coloring agents, such as carbon black or titanium dioxide, flame retarding agents, antimicrobial agents, antistatic agent and/or antifungal agents. After the elastomeric material is pressed onto the upper and lower surfaces of the fabric carcass, the belt my be cut to desired size and splicing steps formed in distal ends as described in further detail below.

Figure 2:
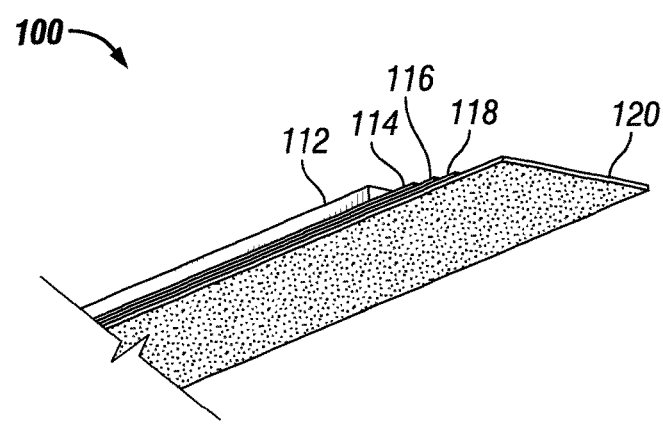
FIG. 2 depicts in a perspective view, an end portion of the belt illustrated in FIG. 1, a track where the layers are orientated in a step configuration.

Conveyor belts made using the fabric reinforcements manufactured utilizing the methods according to the disclosure typically include an elastomeric body having a load carrying surface and a parallel pulley engaging surface wherein the fabric reinforcement(s) is disposed within the elastomeric body of the belt. One end of such a conveyor belt 100 is depicted in FIG. 1 where the fabric reinforcement is comprised of a first fabric layer 102, a plastisol layer 104, and a second fabric layer 106. This fabric reinforcement is situated between a pulley cover layer 108 and load carrying layer 110 of the belt 100. While two fabric layers, 102 and 106, are depicted, any suitable number of fabric layers may be utilized in belts prepared according to the disclosure, such as two, three, four, five, six, and the like. As depicted in FIG. 1, distal end 112 of load carrying layer 110 is formed at a first longitudinal position that is recessed relative a corresponding end of first fabric layer 102 to provide a stepped configuration. As shown in FIG. 2 in more detail, end 112 of load carrying layer 110 is recessed relative corresponding end 114 of first fabric layer 102, end 116 of plastisol layer 104 recessed relative end 114, end 118 of second fabric layer 106 recessed relative end 116, and end 120 of pulley cover layer 108 recessed relative end 118. An opposing distal end of belt 100 includes a reversed orientation of ends to provide a mated configuration of steps for forming a stepped splice of the distal ends, which is shown in further detail in embodiments illustrated in FIGS. 3 and 4 below.

Figure 3:
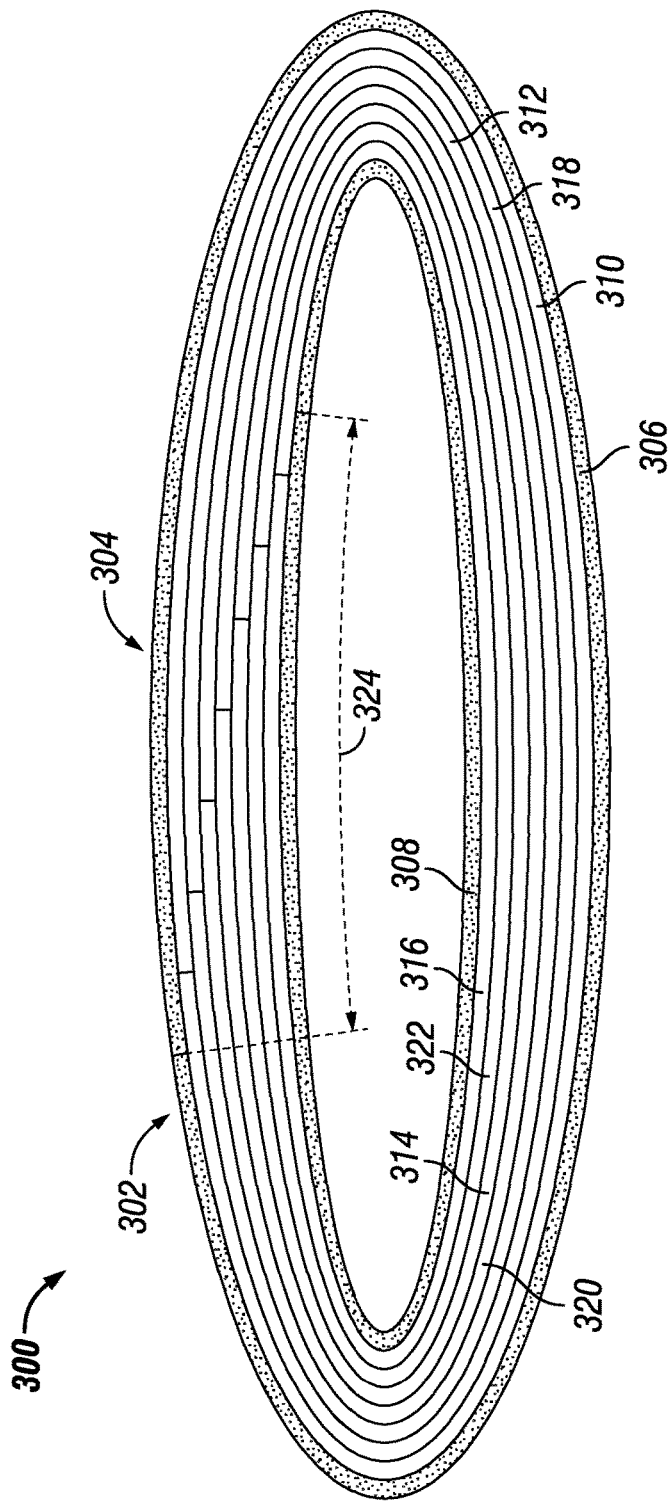
FIG. 3 shows a cross-sectional view of a conveyor belt with a multiply construction having a stepped splice mating configuration, in accordance with embodiments of the disclosure.
Figure 4:
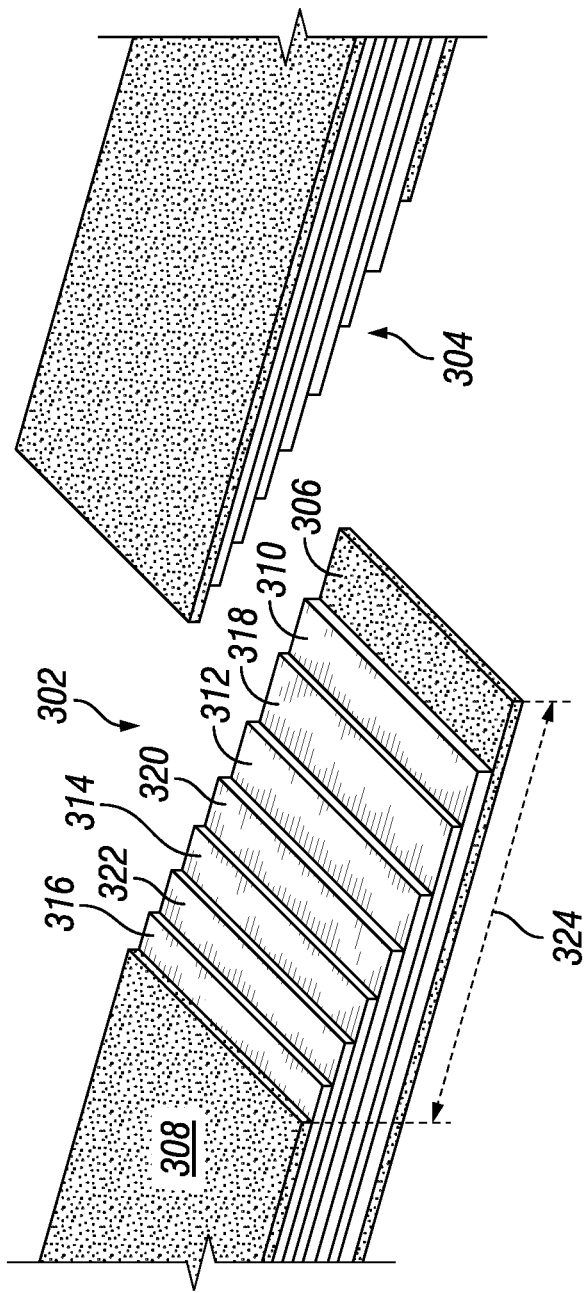
FIG. 4 illustrates in a perspective view, complimenting distal stepped ends of the conveyor belt shown in FIG. 3.

Now referring to FIG. 3, a cross-sectional view is illustrated of conveyor belt 300, which includes distal ends 302 and 304, each with a stepped configuration of layers 306 through 322, which are step spliced at region 324 of the belt 300. Conveyor belt 300 includes load carrying layer 306 and pulley cover layer 308, with a fabric carcass disposed there between. The fabric carcass structurally includes first fabric layer 310, second fabric layer 312, third fabric layer 314, and fourth fabric layer 316, with plastisol layers 318, 320 and 322 disposed between fabric layers as depicted. Each of the load carrying, pulley cover, fabric and plastisol layer ends are sequentially recessed or advanced at distal end regions 302 and 304 of belt 300 as depicted, in order to provide mating ends with abutting layer edges to provide a stepped splice over region 324 without significant gaps between mating ends, which could lead to separation of the belt. Such sequentially recessed or advanced layer ends are further illustrated in more detail by perspective view presented in FIG. 4 where distal end regions 302 and 304 are depicted prior to step splicing.

Figure 5:
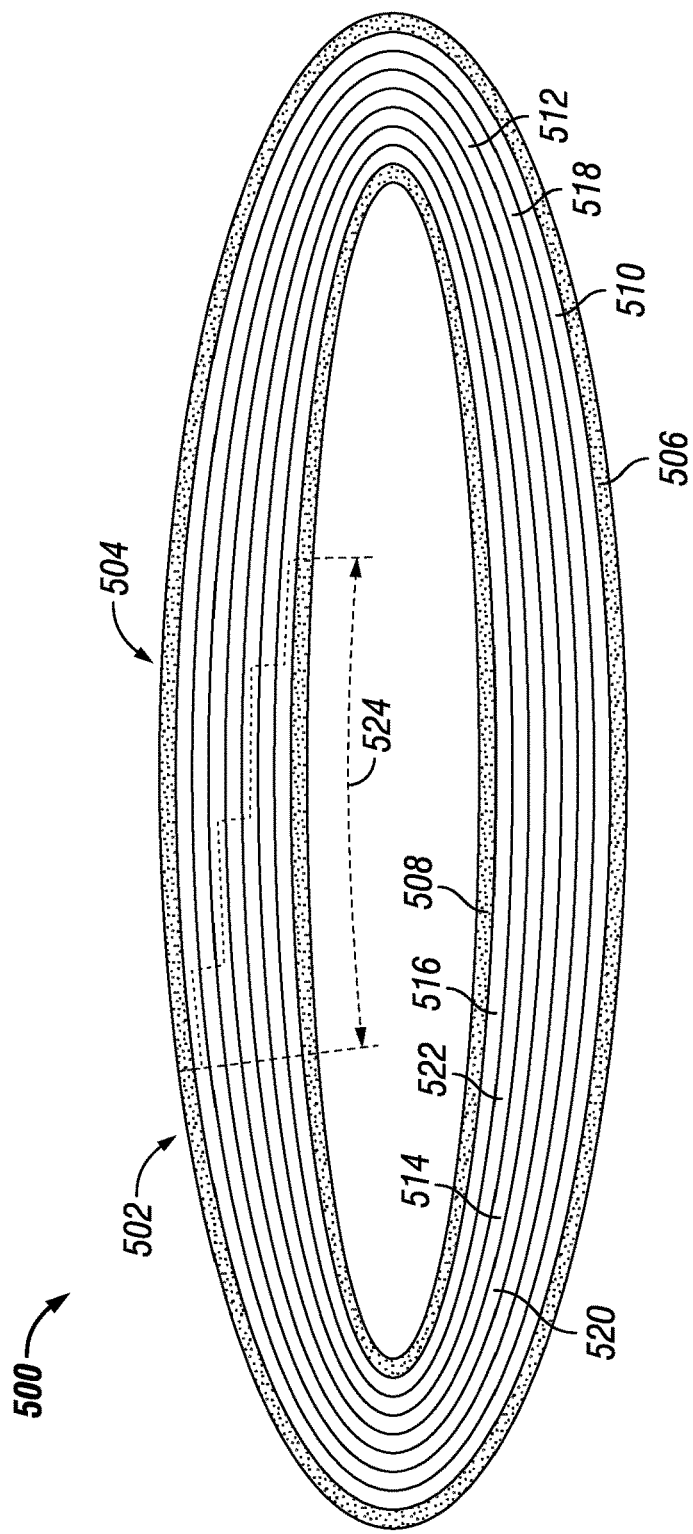
FIG. 5 depicts a cross-sectional view of a conveyor belt with a multiply construction having a stepped splice mating configuration through fabric layers, in accordance with embodiments of the disclosure.
Figure 6:
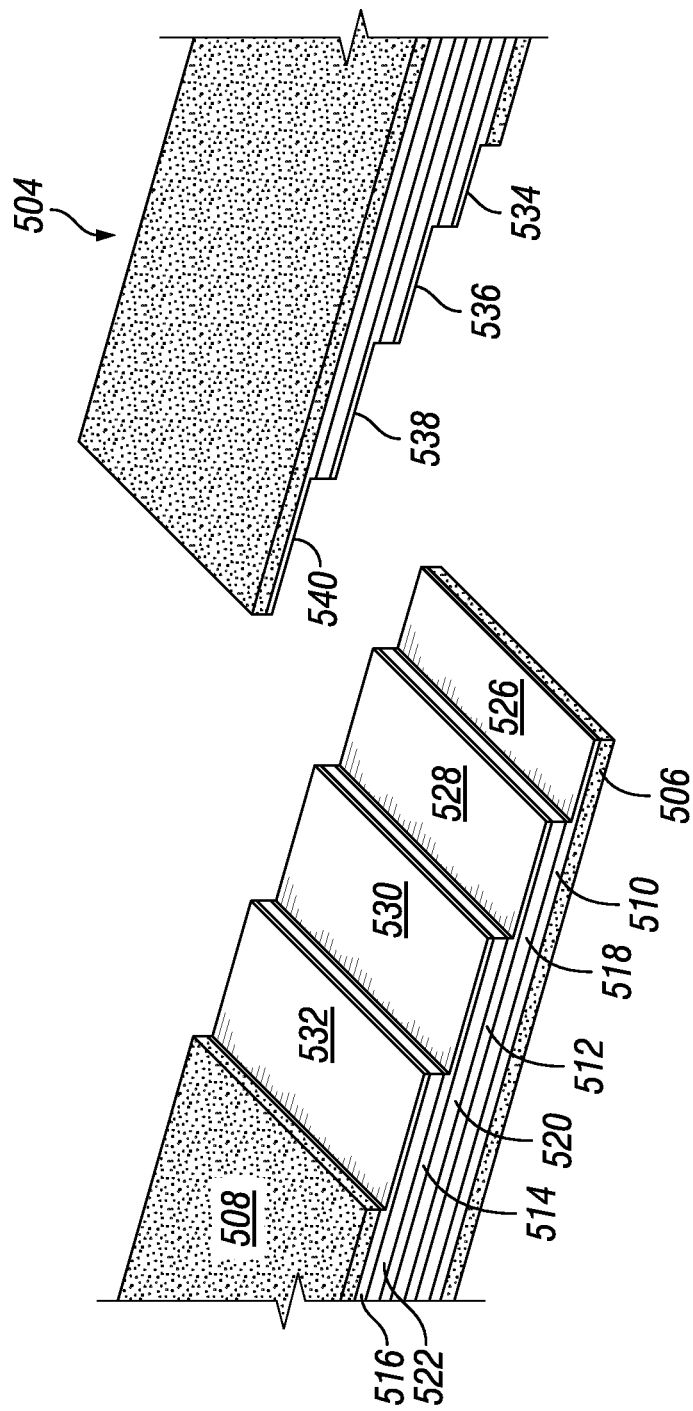
FIG. 6 shows in a perspective view, complimenting distal stepped ends of the conveyor belt shown in FIG. 5.

With reference to FIG. 5, a cross-sectional view is illustrated of conveyor belt 500, which includes distal ends 502 and 504, each with a stepped configuration of layers 506 through 522, which are step spliced at region 524 of the belt. However, in comparison to embodiments depicted in FIG. 3, the mating faces of each of the steps are fabric. Conveyor belt 500 includes load carrying layer 506, pulley cover layer 508, and a fabric carcass disposed there between which includes first fabric layer 510, second fabric layer 512, third fabric layer 514, and fourth fabric layer 516, and plastisol layers 518, 520 and 522 disposed between fabric layers as depicted. The load carrying, pulley cover, fabric and plastisol layers ends are sequentially recessed or advanced, either partially or whole, at distal end regions 502 and 504 to provide mating ends with abutting layer edges allowing a stepped splice over region 524 without significant gaps between mating ends, which could lead to separation of the belt. FIG. 6 illustrates in more detail by perspective view the terminal distal end regions 502 and 504 of belt 500. As depicted in FIG. 6, step faces 526, 528, 530, 532, 534, 536, 538 and 540 are formed of fabric, which upon mating, provide a spliced fabric layer without gaps in the mating ends. Step face 526 is paired with face 534, face 528 paired with face 536, face 530 paired with face 538, and face 532 paired with face 540, to form the stepped splice.

Figure 7:
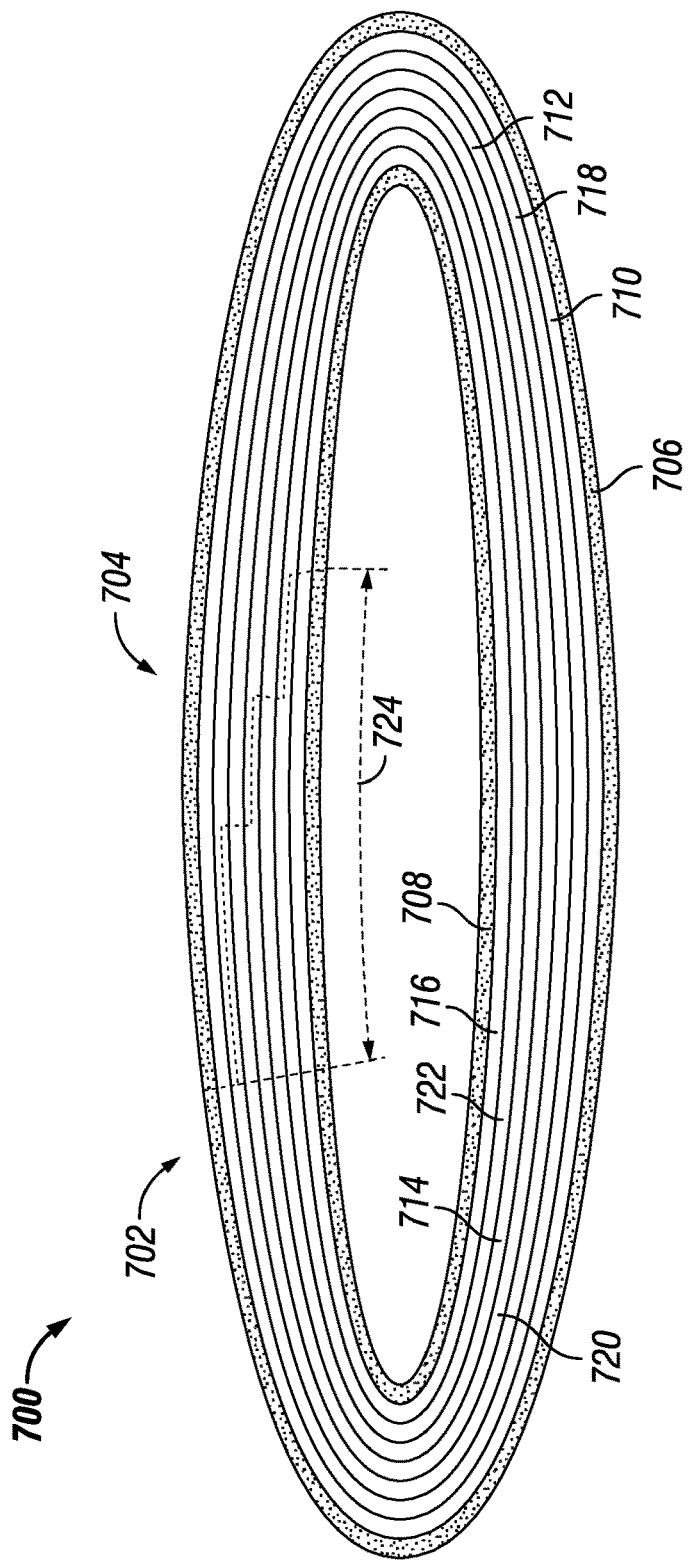
FIG. 7 illustrates a cross-sectional view of a conveyor belt with a multiply construction having a stepped splice mating configuration through plastisol layers, in accordance with embodiments of the disclosure; and, FIG. 8 depicts in a perspective view, complimenting distal stepped ends of the conveyor belt shown in FIG. 7.
Figure 8:
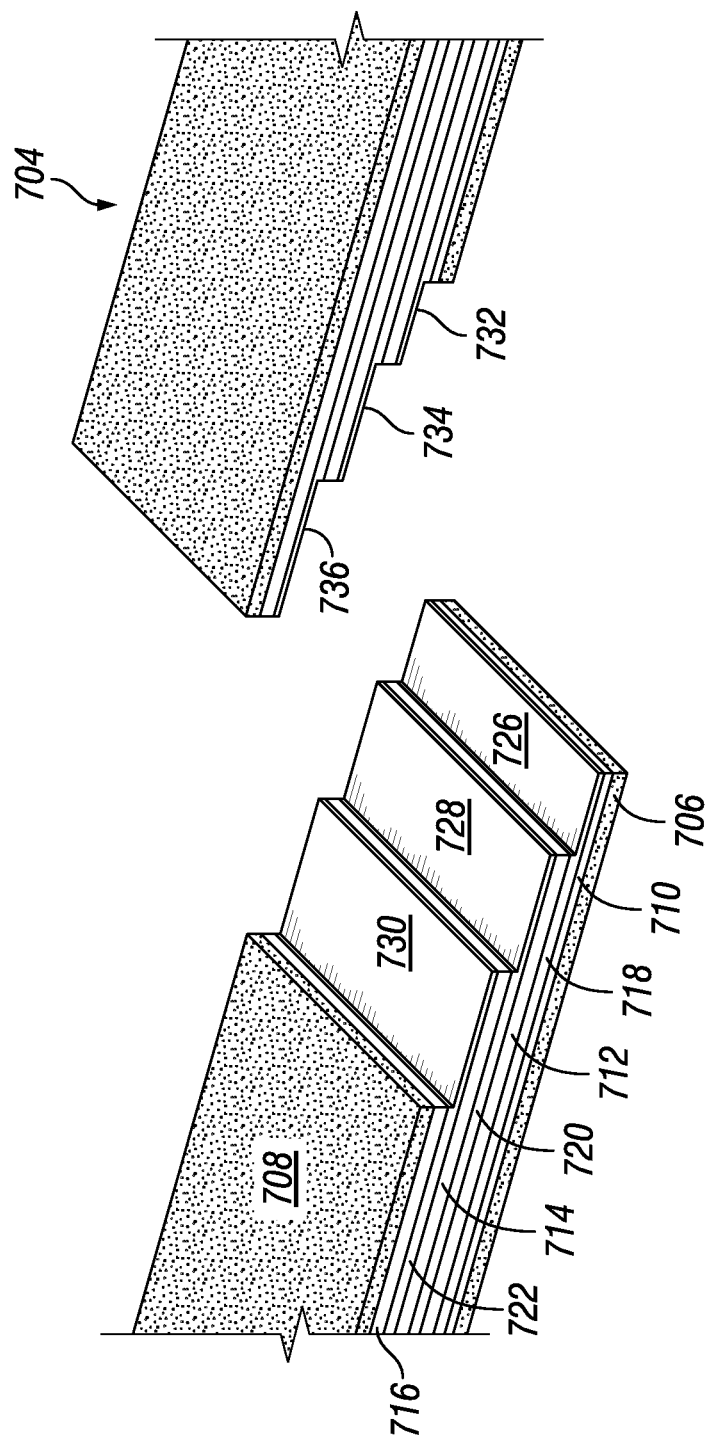

In some other embodiments of the disclosure, step faces may be formed in plastisol layers, as depicted in FIGS. 7 and 8. Now referring to FIG. 7, conveyor belt 700 includes distal ends 702 and 704, each with a stepped configuration of layers 706 through 722 as depicted, which are step spliced at region 724. However, in comparison to embodiments depicted above, the mating faces of each of the steps are plastisol. Ends of the load carrying layer 706, pulley cover layer 708, fabric layers 710, 712, 714, 716, and plastisol layers 718, 720, 722 are sequentially recessed or advanced, either partially or whole, at distal end regions 702 and 704 to provide mating ends with abutting layer edges allowing a stepped splice over region 724 without gaps between mating ends. FIG. 8 illustrates in perspective view the terminal distal end regions 702 and 704 of belt 700, where step faces 726, 728, 730, 732, 734 and 736 are formed of plastisol, which provide a spliced plastisol layer without gaps in the mating ends upon splicing. As depicted, step face 726 is paired with face 732, face 728 paired with face 734, and face 730 paired with face 736, to form the stepped splice.

While the embodiments illustrated above show step faces of or within particular layers, it is with the scope and spirit of the disclosure for step faces to be formed within or at the interface of any of the various layers include in the construction of the conveyor belt. For example, one step face may be located at the outer surface of a fabric layer, while the next step face my be formed within a fabric or plastisol layer, while in some other cases, a step face may be formed at the outer surface of a plastisol layer, while another step face is formed within a fabric or plastisol layer. Any suitable positions of the step faces are within the scope of the disclosure. Further, the distance between separate adjacent abutment ends are of any suitable distance which enable practical construction of a belt, but avoids a plurality or all of the abutted ends from meeting a power turn on a pulley wheel simultaneously.

In some aspects of the disclosure, use of the step splicing techniques described, in conjunction with thermoplastic elastomer polyvinyl chloride alloy based pulley cover layers, load carrying layers, plastisol layers, or combinations thereof, provides stronger splices than mechanical splices with less complex distal end joining than finger splices. In addition, the multiply carcass produces better flexibility, due to the replacement of thick fabric layers with thinner layers coupled together with use of lower modulus thermoplastic elastomer polyvinyl chloride alloy materials. In yet other aspects, conveyor belt embodiments prepared according to the disclosure obviate the need for outermost and/or innermost fabric web layers covered with a covering strip of lattice fabric toward outermost and/or innermost covering sheets, as used in belts disclosed in U.S. Pat. App. Pub. No. 20120015572 A1, which is incorporated herein by reference thereto. In other words, the pulley cover layers, and/or load carrying layers are uniform continuous layers of elastomer which devoid of covering strips of lattice fabric disposed adjacent the abutment of any proximally positioned fabric layer.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method of manufacturing a belt which comprises: (1) impregnating a fabric material with a bonding agent in a plastisol to form coated fabric material, (2) applying a plastisol layer(s) between two or more layers of coated fabric thereby creating a belt carcass, (3) continuously feeding the belt carcass into a double belt press which presses the impregnated fabric materials together with the plastisol layer(s) at a pressure of at least 5 psi to produce a preformed fabric carcass while heating the preformed fabric carcass, (4) continuously withdrawing the fabric carcass from the double belt press, (5) disposing a thermoplastic elastomer polyvinyl chloride alloy composition onto the upper and lower surfaces of the fabric carcass, (6) pressing the thermoplastic elastomer polyvinyl chloride alloy composition onto the upper and lower surfaces of the fabric carcass by continuously feeding the fabric carcass into a second double belt press which is maintained at a temperature of at least 340° F. and at a pressure of at least 5 psi, (7) continuously withdrawing a finished belt from the second double belt press, and (8) splicing opposing distal ends of the belt in a stepped splice configuration;
  wherein each of the plastisol layer(s), and the thermoplastic elastomer polyvinyl chloride alloy composition disposed onto the upper and lower surfaces, are sequentially recessed or advanced at the opposing distal ends of the belt to provide mating ends with abutting layer edges for the splicing in a stepped splice configuration, and wherein step faces are formed within the two or more layers of coated fabric.

2. The method of claim 1 wherein the fabric material is a polyester fabric.

3. The method of claim 1 wherein the fabric material is a nylon fabric.

4. The method of claim 1 wherein the bonding agent is comprised of about 20 weight percent to about 60 weight percent toluene diisocyanate and about 40 weight percent to about 80 weight percent of a plasticizer.

5. The method of claim 1 wherein surfaces of the fabric material are sequentially coated with a mixture of a plastisol and a bonding agent, and then a plastisol to form coated fabric material.

6. The method of claim 1 wherein the weight ratio of the bonding agent to the plastisol is within the range of about 2:98 to about 10:90.

7. The method of claim 1 wherein the coated fabric materials in the double belt press are pressed together at a pressure within the range of 14 psi to 30 psi to produce a preformed fabric carcass.

8. The method of claim 7 wherein the preformed fabric carcass is maintained in the double belt press at a temperature which is within the range of about 380° F. to about 425° F. for a period of at least 8 minutes.

9. The method of claim 1 wherein the double belt press belt has belt surfaces which are comprised of stainless steel.

10. The method of claim 1 wherein the thermoplastic elastomer polyvinyl chloride alloy composition is further comprised of at least one filler.

11. The method of claim 10 wherein the thermoplastic elastomer polyvinyl chloride alloy composition is further comprised of chlorinated polyethylene.

12. The method of claim 10 wherein the thermoplastic elastomer polyvinyl chloride alloy composition is further comprised of antistatic agent.

13. The method of claim 1 wherein the impregnated fabric materials and the plastisol layer(s) are pressed at a pressure of at least 5 psi to produce a preformed fabric carcass while heating the preformed fabric carcass to a temperature which is within the range of about 360° F. to about 450° F. for a period of at least 6 minutes.

14. The method of claim 1 wherein the thermoplastic elastomer polyvinyl chloride alloy composition disposed onto the upper and lower surfaces of the fabric carcass is devoid of covering strips of lattice fabric disposed adjacent an abutment of any proximally positioned fabric layer.

15. A belt made according to the method of claim 1.

16. A method comprising: (1) providing a plurality fabric material layers, (2) applying a plastisol layer between each fabric material layer thereby creating a belt carcass, (3) continuously feeding the belt carcass into a double belt press which presses the fabric material layers together with the plastisol layer at a pressure of at least 5 psi to produce a preformed fabric carcass while heating the preformed fabric carcass, (4) continuously withdrawing the fabric carcass from the double belt press, (5) disposing a thermoplastic elastomer polyvinyl chloride alloy composition onto the upper and lower surfaces of the fabric carcass, (6) pressing the thermoplastic elastomer polyvinyl chloride alloy composition onto the upper and lower surfaces of the fabric carcass by continuously feeding the fabric carcass into a second double belt press, (7) continuously withdrawing a finished belt from the second double belt press, and (8) splicing opposing distal ends of the belt in a stepped splice configuration;
  wherein the plastisol layer, and the thermoplastic elastomer polyvinyl chloride alloy composition disposed onto the upper and lower surfaces, are sequentially recessed or advanced at the opposing distal ends of the belt to provide mating ends with abutting layer edges for the splicing in a stepped splice configuration, and wherein a step face is formed within each of the plurality of fabric material layers.

17. The method of claim 16 wherein the fabric material layers and the plastisol layer are pressed at a pressure of at least 5 psi to produce a preformed fabric carcass while heating the preformed fabric carcass to a temperature which is within the range of about 360° F. to about 450° F. for a period of at least 6 minutes.

18. The method of claim 17 wherein the preformed fabric carcass is maintained in the double belt press at a temperature which is within the range of about 380° F. to about 425° F. for a period of at least 8 minutes.

19. The method of claim 16 wherein the thermoplastic elastomer polyvinyl chloride alloy composition disposed onto the upper and lower surfaces of the fabric carcass is devoid of covering strips of lattice fabric disposed adjacent an abutment of any proximally positioned fabric layer.

20. A method comprising: (1) providing a plurality fabric material layers, (2) applying a plastisol layer(s) between each fabric material layer thereby creating a belt carcass, (3) pressing the fabric material layers together with the plastisol layer(s) at a pressure of at least 5 psi to produce a preformed fabric carcass while heating the preformed fabric carcass to a temperature which is within the range of about 360° F. to about 450° F. for a period of at least 6 minutes, (4) disposing a thermoplastic elastomer polyvinyl chloride alloy composition onto the upper and lower surfaces of the fabric carcass, (5) pressing the thermoplastic elastomer polyvinyl chloride alloy composition onto the upper and lower surfaces of the fabric carcass, and (6) splicing opposing distal ends of the belt in a stepped splice configuration, wherein the thermoplastic elastomer polyvinyl chloride alloy composition disposed onto the upper and lower surfaces of the fabric carcass is devoid of covering strips of lattice fabric disposed adjacent an abutment of any proximally positioned fabric layer;
  wherein each of the plastisol layer(s), and the thermoplastic elastomer polyvinyl chloride alloy composition disposed onto the upper and lower surfaces, are sequentially recessed or advanced at the opposing distal ends of the belt to provide mating ends with abutting layer edges for the splicing in a stepped splice configuration, and wherein a step face is formed within each of the plurality of fabric material layers.

* * * * *